US012698882B2

(12) United States Patent (10) Patent No.: US 12,698,882 B2
Dimaria et al. (45) Date of Patent: Aug. 4, 2026

(54) LIGHTING DEVICE AND PRIMARY OPTICS FOR SHAPING FAR-FIELD LIGHT EMISSION OF LED ARRAY AND METHOD OF MANUFACTURE

(71) Applicant: LUMILEDS LLC, San Jose, CA (US)

(72) Inventors: Jeff Dimaria, San Jose, CA (US);
Yu-Chen Shen, San Jose, CA (US);
Rene Helbing, San Jose, CA (US);
Luke Gordon, San Jose, CA (US)

(73) Assignee: Lumileds Singapore Pte. Ltd.,
Singapore (SG)

( * ) Notice: Subject to any disclaimer, the term of this patent is extended or adjusted under 35 U.S.C. 154(b) by 0 days.

(21) Appl. No.: 19/002,175

(22) Filed: Dec. 26, 2024

(65) Prior Publication Data

US 2026/0185679 A1 Jul. 2, 2026

(51) Int. Cl.
*F21V 5/00* (2018.01)
*F21S 41/153* (2018.01)
*F21S 43/20* (2018.01)
*F21Y 105/10* (2016.01)
*F21Y 105/16* (2016.01)
*F21Y 113/00* (2016.01)
*F21Y 115/10* (2016.01)
*G02B 27/09* (2006.01)

(52) U.S. Cl.
CPC ............ *F21V 5/007* (2013.01); *F21S 41/153* (2018.01); *F21S 43/2641* (2024.05); *F21Y 2105/10* (2016.08); *F21Y 2105/16* (2016.08); *F21Y 2113/00* (2013.01); *F21Y 2115/10* (2016.08); *G02B 27/0966* (2013.01)

(58) Field of Classification Search
CPC .. F21V 5/007; F21Y 2105/10; F21Y 2105/16; F21Y 2113/00; G02B 27/0966; G02B 27/0961; F21S 41/153; F21S 43/15; F21S 43/2641
See application file for complete search history.

(56) References Cited

U.S. PATENT DOCUMENTS

| | | | |
|---|---|---|---|
| 11,859,786 B2 * | 1/2024 | Song | F21S 43/315 |
| 12,359,788 B2 * | 7/2025 | Kim | G02B 30/29 |
| 2006/0186431 A1 * | 8/2006 | Miki | H10H 20/853 257/E33.059 |
| 2008/0144322 A1 | 6/2008 | Norfidathul et al. | |

(Continued)

FOREIGN PATENT DOCUMENTS

| | | |
|---|---|---|
| CN | 102980133 A | 3/2013 |
| JP | H1195168 A | 4/1999 |
| WO | 2017184581 A1 | 10/2017 |

*Primary Examiner* — Tracie Y Green
*Assistant Examiner* — Michael Chiang
(74) *Attorney, Agent, or Firm* — Volpe Koenig

(57) ABSTRACT

Lighting devices, lens arrays, and method of manufacture are described herein. A lighting device includes an LED array that includes rows and columns of light-emitting diode (LED) dies on a common substrate. A lens array is disposed over the array of LED dies. The lens array includes multiple lenses, each having a bullet-shaped cross-section and disposed over a respective row of the LED dies in the LED array such that an invariant axis of each of the lenses is aligned along the row of LEDs and an axis of periodicity of the lenses is perpendicular to the invariant axis.

14 Claims, 8 Drawing Sheets

(56)  References Cited

U.S. PATENT DOCUMENTS

| | | | |
|---|---|---|---|
| 2011/0222264 A1* | 9/2011 | Matsuda | H05B 45/56 |
| | | | 257/89 |
| 2015/0261000 A1 | 9/2015 | Ohbitsu | |
| 2017/0154920 A1 | 6/2017 | Ono et al. | |
| 2017/0186928 A1 | 6/2017 | Ono et al. | |
| 2017/0314764 A1* | 11/2017 | Kishikawa | B41J 11/00218 |
| 2018/0178247 A1* | 6/2018 | Aizawa | B05D 3/067 |

* cited by examiner

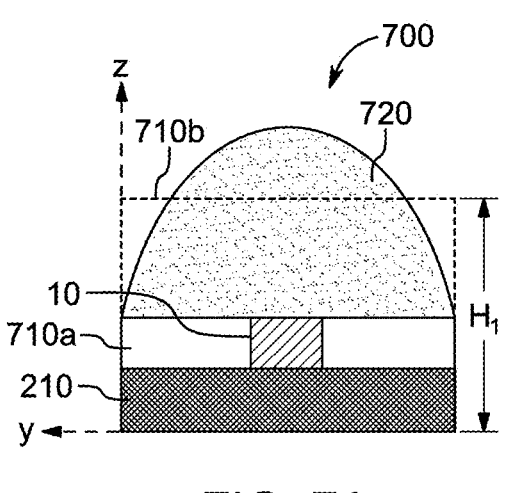
FIG. 7A
FIG. 7B
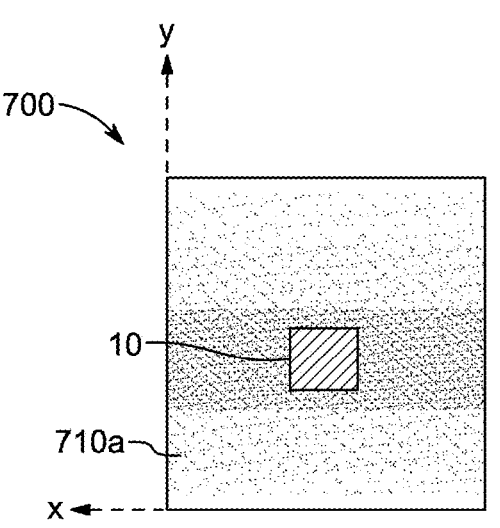
FIG. 7C
FIG. 7D

1200

1210

1300

1310

LIGHTING DEVICE AND PRIMARY OPTICS FOR SHAPING FAR-FIELD LIGHT EMISSION OF LED ARRAY AND METHOD OF MANUFACTURE

BACKGROUND

Automotive forward lighting is typically designed to enhance the ability of the driver to navigate the roadway and obstacles without excess glare on oncoming drivers. Automotive rear and signaling lighting, on the other hand, are typically designed to enable or improve the ability of other road users to understand the intentions of the driver of the car (e.g., braking, intention to turn, or hazard). Matrix displays can be used in automotive front, rear and signaling lighting applications to support the various design goals. For front lighting, this means, for example, directing light emission towards areas of the road that support visibility by the driver of the automobile and away from on-coming traffic. For rear and signaling lighting, this means, for example, providing more information to road users behind the automobile than previously possible. The attributes of such rear lighting applications, and the distributed potential of LED light sources, expand the space for new and different optical designs to achieve higher brightness, compact form factors, enhanced functionality, and reduced cost in rear lighting applications.

SUMMARY

Lighting devices, primary optics and methods of manufacture are described herein. A lighting device includes an LED array that includes rows and columns of light-emitting diode (LED) dies on a common substrate. A lens array is disposed over the array of LED dies. The lens array includes multiple lenses, each having a bullet-shaped cross-section and disposed over a respective row of the LED dies in the LED array such that an invariant axis of each of the lenses is aligned along the row of LEDs and an axis of periodicity of the lenses is perpendicular to the invariant axis.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 7A is a diagram of another example unit cell in side (YZ) view;

FIG. 7B is a diagram of the example unit cell of FIG. 7A in front (XZ) view;

FIG. 7C is a diagram of the example unit cell of FIGS. 7A and 7B and in top down (XY) view an optical side coat;

FIG. 7D is a diagram of the example unit cell of FIGS. 7A and 7B without the optical side coat;

DETAILED DESCRIPTION

Figure 1:
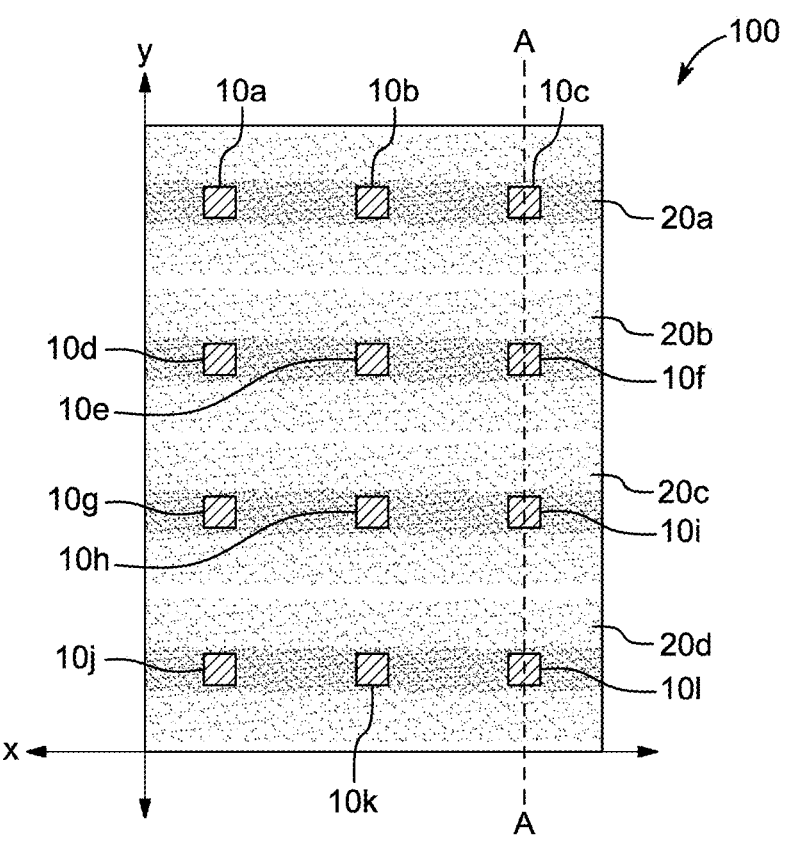
FIG. 1 is a top down (or XY) view of an example lighting device.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Primary optics in automotive rear lighting may include optical components, such as lenses and reflectors, that may directly shape, direct, and control the light emitted from the rear lights of a vehicle. These optics are typically used to ensure that the light output meets regulatory standards for brightness, visibility, and beam pattern, optimizing the light distribution for signaling, braking, and rear visibility. The design of primary optics is crucial for safety, as it ensures that the light is highly visible to other drivers at various distances and angles, while minimizing glare and maximizing efficiency by focusing light where it's needed most. In modern designs, advanced materials and precision engineering are used to create highly effective and aesthetically pleasing rear lighting systems.

Secondary optics in automotive rear lighting may include optical elements that further manipulate and refine the light after it has passed through the primary optics. While primary optics focus on directing the initial light output, secondary optics are used to enhance the beam's distribution, uniformity, and aesthetic appeal. These can include diffusers, light guides, and reflectors that help spread or blend the light more evenly across the rear light assembly, creating a smooth and visually striking appearance. Secondary optics also play a role in achieving specific design elements, like sharp light signatures or uniform illumination, which are important for both functionality and brand identity. They contribute to ensuring the light is well-distributed and meets safety regulations while adding a stylish touch to the vehicle's rear lighting.

Most common implementations of LED rear lighting require secondary optics to direct and shape the distribution of light for road users. Embodiments described herein, however, concern the use and optimization of the primary optics, such as mini and micro lens arrays, to shape the far-field beam profile, using cylindrical lenses in the lens arrays. Cylindrical lenses focus or magnify light in only one dimension, unlike spherical lenses that affect light uniformly in all directions. When disposed over entire rows of LED dies or emitters in an LED array, a cylindrical lens will focus or magnify light along the axis perpendicular to the row of LEDs over which it is disposed. This may be referred to herein as the axis of periodicity because, in this direction, a distinct cylindrical lens is disposed over each of the LEDs in the column. In this direction, the cylindrical lens exerts its focusing power, bending light rays to bring them to a focal point. The axis of the cylindrical lens that extends along the row of LEDs over which it is disposed may be referred to herein as the invariant axis. The invariant axis of the lens does not refract light. Light traveling along this axis passes through the lens without being bent. In embodiments described herein, the lens curvature and height of the lens can be optimized to direct light emitted from the LED into a narrow far-field angular range along the axis of periodicity with full width half maximum (FWHM)~+/−15 degrees or less while maintaining a Lambertian (+/−60 deg.) profile along the invariant axis. The shaping of cylindrical lenses can increase peak illuminance within an angular range by up to a factor of 3 or more relative to an LED array without such a lens array. This reduces the power required to achieve the same apparent illuminance for other road users and/or can reduce cost by reducing the number and/or size of LED emitters required to achieve the same illuminance.

While cylindrical lenses do not refract light along the invariant axis, magnification can occur when observed on direct view through the lens. The magnification is due to asymmetric distortion of the image, caused by the lens's focusing effect along the axis of periodicity. When light passes through the lens, objects may appear stretched or elongated along the invariant axis because the lens affects light asymmetrically. The physical distortion of the light paths in one direction causes a perceived change in size along the axis where no direct focusing happens. Nevertheless, pixels that appear square are ideal for embodiments where the lighting device is being used to display an image (e.g., displaying an arrow to indicate the direction the operator is preparing to turn). Embodiments described herein therefore provide for a combination of the lens array with LED dies of different aspect ratios that are wider along the axis of periodicity and narrower along the invariant axis (the direction the lens magnifies). The aspect ratio of such LED dies may be varied from a 1:1 aspect ratio to an 8:1 aspect ratio in some cases, which, depending on other characteristics of the lenses and/or LED dies, may make the pixels appear square on direct view. Other related concepts are also described herein that result in a square-appearing pixel on direct view, including surrounding the lens array with a reflective optical side coat material, reducing the size of the cylindrical lenes along the axis of periodicity, or some combination of all, or some, of these concepts. As will be apparent to one of ordinary skill in the art, the embodiments described herein can be used individually or together to create a cost-effective, power-efficient, matrix display that is also usable to clearly display crucial information to drivers behind the vehicle.

Embodiments are described below in terms of a matrix display for automotive rear and/or signaling lighting. However, one of ordinary skill in the art will understand that the concepts described herein can also be applied to other applications, such as standard tail lights, signaling lights, daytime running lights, decorative trim, pool lights, or headlights, for example, to clearly display information or otherwise provide lighting with reduced power requirements and/or reduced cost. Such embodiments can also be used in other display applications that allow for a narrower angular range along the axis of periodicity, such as computer monitors or others.

FIG. 1 is a top down (or XY) view 100 of an example lighting device. In the example illustrated in FIG. 1, the lighting device includes an LED array including LEDs 10a, 10b, 10c, 10d, 10e, 10f, 10g, 10h, 10i, 10j, 10k and 10l, and a corresponding lens array, including cylindrical lenses 20a, 20b, 20c and 20d over each row of LEDs.

In the example illustrated in FIG. 1, the cylindrical lens array has the same periodicity as the underlying LED array along the y-axis, and each of the LEDs has a 1:1 aspect ratio. The illustrated cylindrical lens array is invariant along the x-axis. LED array periodicity can vary from 2 μm up to 30 mm, with typical periodicity around 1 mm, and will be larger than the LED size. When the cylindrical lens array period matches that of the underlying LED array, the lens magnifies the source (in this case, along the y-axis). The periodicity of the lens array along the x-axis is larger than the periodicity of the underlying LED array, with each of the cylindrical lenses 20a, 20b, 20c and 20d disposed over a respective entire row of LEDs in the underlying LED array.

Figure 2:
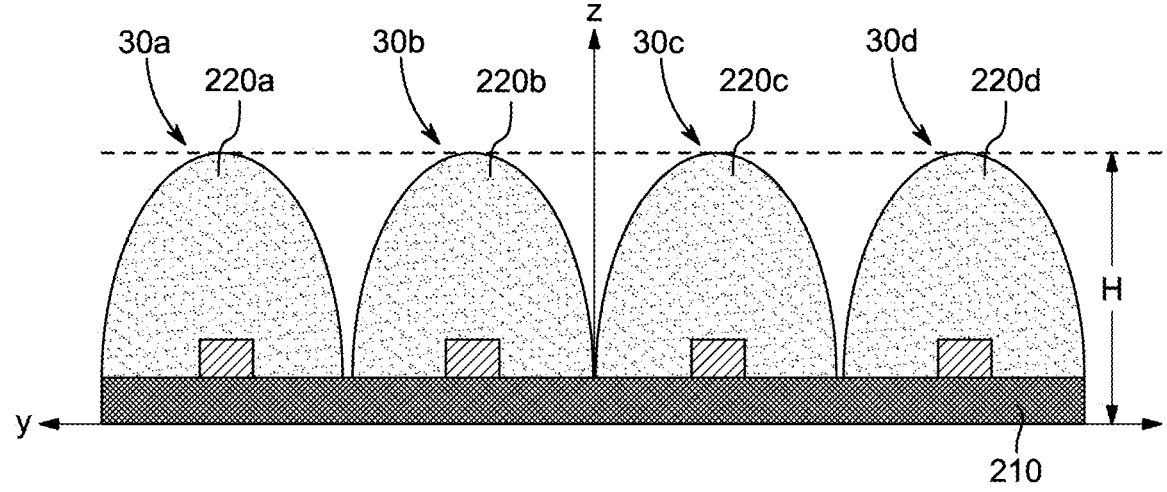
FIG. 2 is a cross-sectional view of the example lighting device of FIG. 1 taken along the line A-A in FIG. 1.

FIG. 2 is a cross-sectional view 200 of the example lighting device of FIG. 1 taken along the line A-A in FIG. 1. In the example illustrated in FIG. 2, four unit cells 30*a*, 30*b*, 30*c* and 30*d* are shown, each including the primary optics (lenses in the illustrated example) and LED for one position (or unit cell) in the LED array and lens array. The curvature of the lenses 220*a*, 220*b*, 220*c*, 220*d* (i.e., in the Z direction) is visible in FIG. 2. The curvature and height, H, of the lenses 220*a*, 220*b*, 220*c*, 220*d* can be optimized to direct light emitted from the underlying LED into a narrow far-field angular range along the Y axis while maintaining a near Lambertian profile along the X axis. By way of example, the light emission along the Y axis may have full width half maximum (FWHM) approximately +/−15 degrees or less while maintaining a Lambertian (+/−60 degrees) profile along the X axis.

Figure 3:
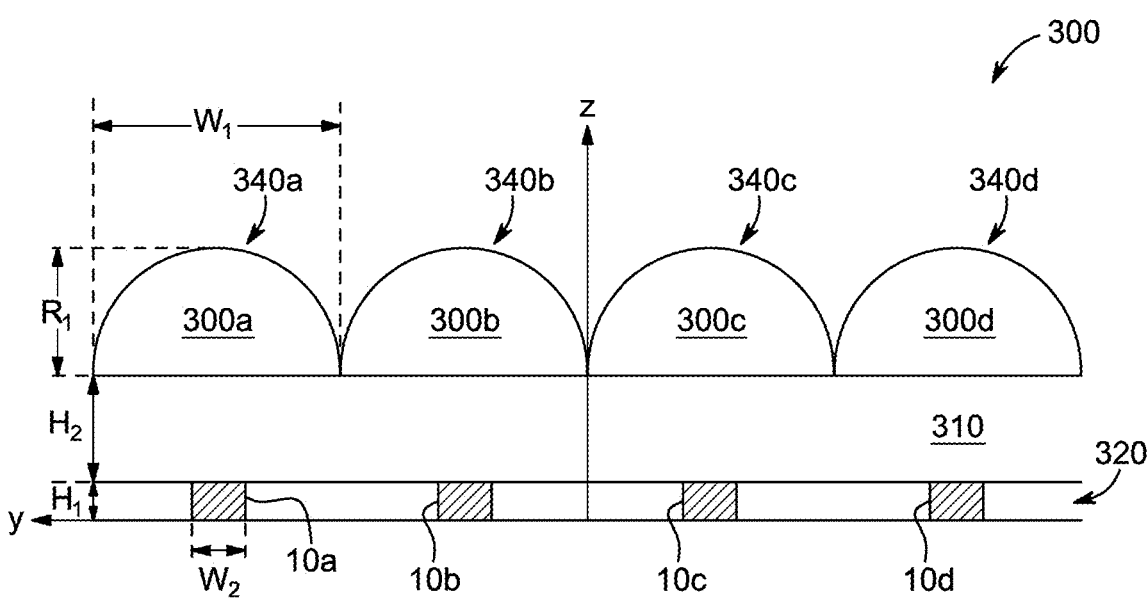
FIG. 3 is a cross-section view of another example lighting device, showing four unit cells.

FIG. 3 is a cross-sectional view 300 of another example lighting device, showing four unit cells 340*a*, 340*b*, 340*c* and 340*d*. In the example illustrated in FIG. 3, each unit cell 340*a*, 340*b*, 340*c*, 340*d* includes an LED 10*a*, 10*b*, 10*c*, 10*d*, respectively, and a portion of the lens array, which includes hemicylinder shaped lenses 300*a*, 300*b*, 300*c* and 300*d*, respectively. Each of the hemicylinder shaped lenses 300*a*, 300*b*, 300*c*, 300*d* has the same height (corresponding to lens radius R1 in FIG. 3) in the Z direction and a width, W1 (only labeled for unit cell 340*a* for clarity), in the Y direction. A planar silicone region 310 is provided below the lenses 300*a*, 300*b*, 300*c* and 300*d*. The planar silicone region 310 has a height H2, in the Z direction, which increases the height of the primary optic in each unit such that each unit cell 340*a*, 340*b*, 340*c*, 340*d* has a taller, bullet-shaped cross-section having a height H2 plus R1 in the Z direction. Similar to the embodiment illustrated in FIGS. 1 and 2, each cylindrical lens is disposed over a row of LEDs (only 10*a*, 10*b*, 10*c*, 10*d* in the cross-section are illustrated). In the example illustrated in FIG. 3, the cylindrical lens array can be can be constructed by molding the array of hemicylinder shaped lenses 300 over the planar silicone region 310. In some embodiments, the LEDs 10*a*, 10*b*, 10*c* and 10*d* may also be encased in silicone 320 (or other filler or encapsulant material) such that the planar silicone 310 layer is deposited over the layer of silicone 320, and then the hemicylinder shaped lenses 300 may be molded over the planar silicone 310. In the illustrated example, the layer of silicone 320 has height H1 equal to the height of the underlying LEDs. One of ordinary skill in the art will readily understand, however, that the height of the silicone layer 320 is not critical and could be, for example, thicker than the height of the LEDs without departing from the scope of the embodiments described herein.

Figure 4:
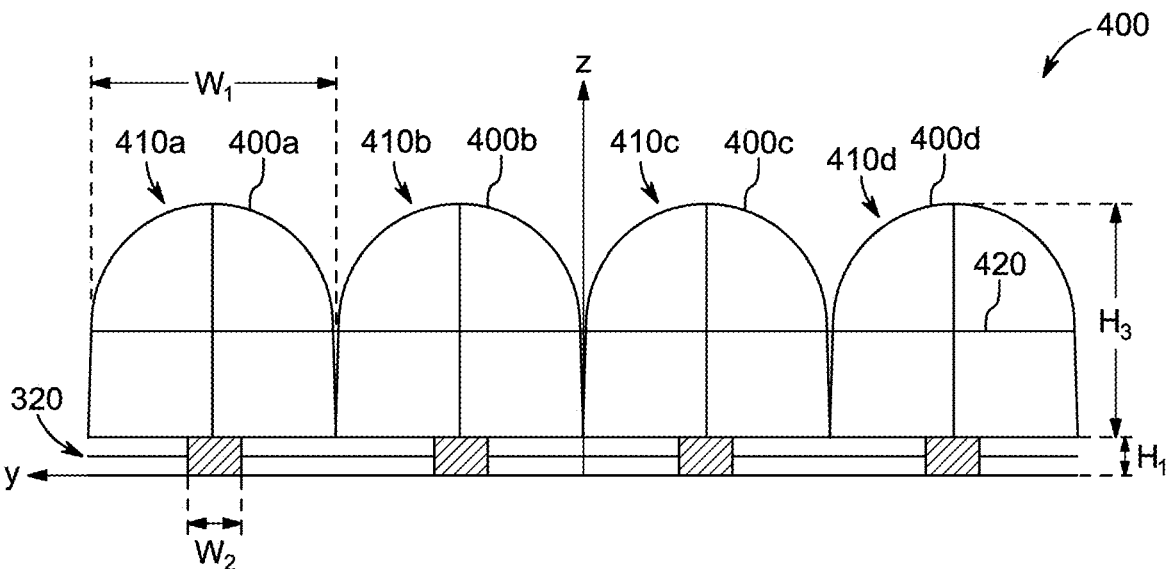
FIG. 4 is a cross-section view of another example lighting device, showing four unit cells.

FIG. 4 is a cross-sectional view 400 of another example lighting device, showing four unit cells 410*a*, 410*b*, 410*c* and 410*d*. In the example illustrated in FIG. 4, the planar silicone region is reduced, and each of the lenses 400*a*, 400*b*, 400*c*, 400*d* has a taller profile in the Z direction than the hemicylinder shaped lenses 300*a*, 300*b*, 300*c* and 300*d*, resulting in each lens having a bullet-shaped cross-section in the Z direction similar to the embodiment illustrated in FIG. 3. In the example illustrated in FIG. 4, the planar silicone region 320 does not extend beyond the tops of the underlying LEDs 10*a*, 10*b*, 10*c*, 10*d* in the Z direction (although in some embodiments, it could extend some height above the tops of the LEDs, but less than the height of the silicone illustrated in FIG. 3, if desired). The cylindrical lens array illustrated in FIG. 4 can be constructed by molding the non-hemicylinder shaped lenses, similar to the hemicylinder shaped lenses. The line 420 in FIG. 4 shows where the bottom surface of the corresponding hemicylinder shaped lenses of FIG. 3 would be located (for basis of comparison only).

For both the embodiments illustrated in FIG. 3 and FIG. 4, the LEDs 10*a*, 10*b*, 10*c* and 10*d* have a width w2 in the Y direction, and a length in the X direction (not visible in FIGS. 3 and 4), with the width w2 of each LED being the same and the length of each LED also being the same. In an example embodiment, the length of each of the LEDs is 0.25 mm and the width of each of the LEDs is 0.25 mm. The height in the Z direction of each of the LEDs is 0.9 mm in this example. In the example illustrated in FIG. 3, the first silicone region 320 has a height H1 (the same as the LEDs) of 0.9 mm. The second silicone region 310 has a height H2 of 0.5 mm. A radius R1 of the hemicylinder lenses is 0.5 mm. In the example illustrated in FIG. 4, the height H1 of the silicone region 320 (also referred to herein as a silicone layer, a single silicone layer, or a single silicone region) is 0.9 mm (the same as the height in the Z direction of the underlying LEDs). The height H3 of the lenses 400*a*, 400*b*, 400*c* and 400*b* above the top of the silicone region 320 is 0.864 mm. All of these dimensions may be considered to include +/−10% tolerances.

Figure 5:
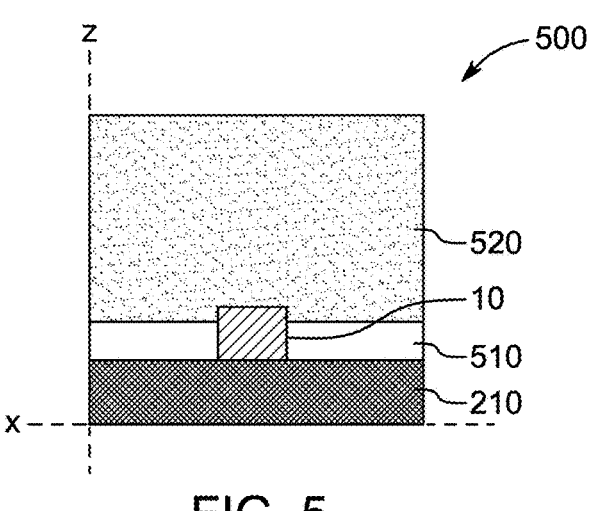
FIG. 5 is a side view of an example unit cell.

FIG. 5 is a side view 500 of an example unit cell. In the example illustrated in FIG. 5, the unit cell 500 includes an LED 10 of an LED array on a portion of a substrate 210. A primary optic 520, which may be a single cylindrical lens of a cylindrical lens array (as illustrated in FIG. 4) or a hemicylindrical lens and corresponding portion of a planar silicone region (as illustrated in FIG. 3), is disposed over the LED 10. A layer 510 of a reflective coating is disposed on the substrate 510, surrounding the LED 10 and extending to the edges of the substrate portion within the unit cell 500. The layer 500 of the reflective coating may improve LED illuminance across the top surface of the substrate 210, which is the surface magnified by the cylindrical lens array and make it appear uniform across the entire magnified surface. The reflective coating may be, for example, a dispensed reflective side coat (DSC) or an optical side coat (OSC) applied by other means.

The structures illustrated in FIGS. 3 and 4, and described above, may be sufficient to provide >3× on-axis illuminance (Cd) relative to a bare LED die (without such structures) due to the bullet shape of the lenses. However, in the embodiments illustrated in FIGS. 3 and 4 and described above, due to the periodicity of the lenses being the same as the underlying LEDs, and the LED dies having a square shape, the cylindrical lens array magnifies the apparent LED image on direct-view, making the light emission appear stretched and more rectangular in shape, which is undesirable for display applications where images may need to be displayed using the vehicle's rear lights. Advantageously, the direct-view experience can be improved, along with efficiency, by one or more of increasing the die aspect ratio, as illustrated in FIG. 6, surrounding the lens array with optical side coat (OSC) material, as illustrated in FIG. 7, reducing the size of the cylindrical lens array along the vertical axis, as illustrated in FIG. 8, or some combination of two or more of these features. FIG. 9 illustrates a combination all of these features, although one of ordinary skill in the art will understand that, in some embodiments, a sub-set (less than all) of these features may be combined within the scope of the embodiments described herein.

Figures 6A, 6B:
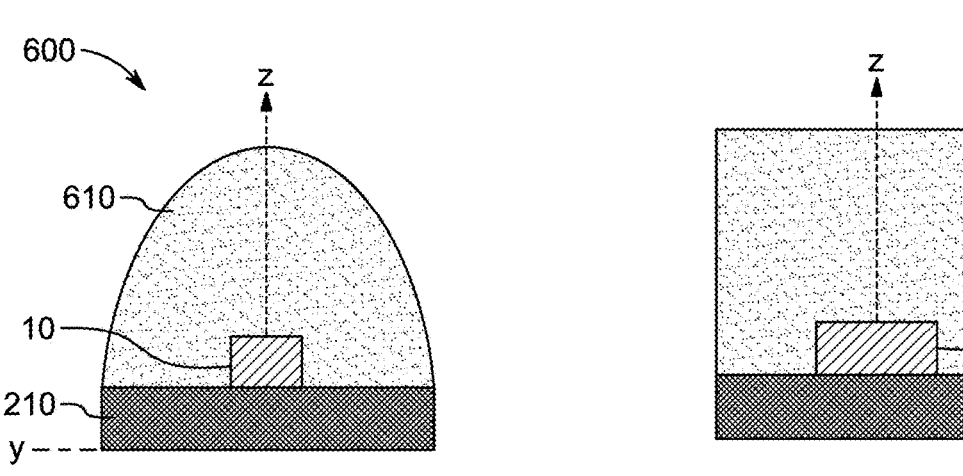
FIG. 6A is a diagram of an example unit cell in side (YZ) view.
FIG. 6B is a diagram of the example unit cell of FIG. 6A in front (XZ) view.
Figure 6C:
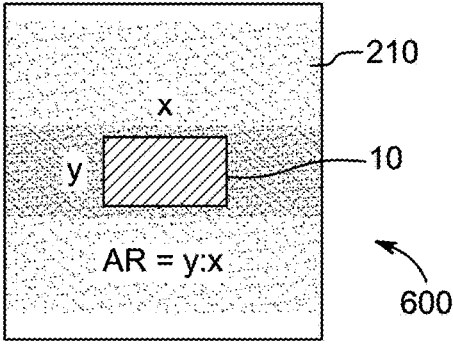
FIG. 6C is a diagram of the example unit cell of FIGS. 6A and 6B in top down (XY)

FIG. 6A is a diagram of an example unit cell 600 in side (YZ) view. FIG. 6B is a diagram of the example unit cell 600 in front (XZ) view. FIG. 6C is a diagram of the example unit cell 600 in top down (XY). In the example illustrated in FIGS. 6A, 6B and 6C, an LED 10 is disposed on a substrate 210 with a lens 610 disposed over the LED 10 and over the substrate 210. The lens 610 may bullet-shaped (e.g., having a shape corresponding, or similar in shape, to the lens 400 of FIG. 4, or lens 300 and corresponding portion of planar silicone layer 310 of FIG. 3). The LED 10 has a width, x, in the x-direction (along the invariant axis), and a length, y, in the y-direction (along the axis of periodicity). The aspect ratio (AR) of the LED die in FIGS. 6A, 6B, and 6C, therefore, can be represented as y:x, where the y dimension is along the axis of periodicity of the lens array, and the x dimension is along the invariant axis. The exact LED dimensions can vary over a wide range, from 1.0 µm×1.0 µm to 2 mm×2 mm, and the aspect ratio of the LED die may vary from 1:1 to 8:1 without changing the overall LED surface area.

When matrix displays are used purely for lighting, such as in vehicle headlights, the direct-view shape of the unit cells (or pixels) is not important, and the pixels would typically appear round if a user were to look directly at them due to the shape of conventional primary optics. However, when they are used for display purposes, such as displaying an arrow corresponding to a turn signal, for example, pixels that appear square on direct-view are ideal. When a lens array, such as illustrated in, and described above with respect to, for example, FIGS. 3 and 4, is combined with LED dies of different aspect ratios that are wider in the X dimension and narrower in the Y dimension (along the direction that the lens magnifies), the pixel may be made to appear square on direct-view, such as when the aspect ratio X:Y is anywhere from around 3:1 to 8:1. The exact aspect ratio to achieve a square pixel may depend, however, on the curvature of the lens, the lens extent in the X dimension, and/or an aperture created by an optical side coat surrounding the lens (as described in more detail below).

FIG. 7A is a diagram of a unit cell 700 in side (YZ) view. FIG. 7B is a diagram of the example unit cell 700 of FIG. 7A in front (XZ) view. FIG. 7C is a diagram of the example unit cell of FIGS. 7A and 7B and in top down (XY) view an optical side coat. FIG. 7D is a diagram of the example unit cell 700 of FIGS. 7A and 7B without the optical side coat. In the example illustrated in FIGS. 7A, 7B, 7C and 7D, an LED 10 is disposed on a substrate 210 with a lens 720 disposed over the LED 10 and over the substrate 210. The lens 720 may be bullet-shaped (e.g., having a shape corresponding, or similar in shape, to the lens 400 of FIG. 4 or the lens 300 and the corresponding portion of the planar silicone layer 310 of FIG. 3).

Similar to the example unit cell 500 illustrated in FIG. 5, the unit cell 700 of FIGS. 7A, 7B, 7C and 7D includes a reflective coating 710a over the substrate 210 (also referred to herein as a first reflective coating or layer) as well as a reflective coating 710b (represented by box 710b in broken lines in FIG. 7A for clarity and also referred to herein as a second reflective coating or layer). Similar to the example illustrated in FIG. 5, the reflective coatings 710a and 710b may be either a DSC or an OSC. The addition of the reflective coating 710b surrounding the lens 720 creates an aperture 730 (visible in the XY view in FIG. 7D) that reduces the direct-view pixel size along the axis of periodicity, making the light emission appear square. The height, H1, of the reflective coating 710b can vary from 0 µm to the full lens height depending on, for example, desired brightness, power requirements, and/or desired direct-view pixel shape and/or size. The inclusion of the reflective coating 710a over the substrate 210, as shown in FIGS. 7A and 7B, can increase the efficiency of the lighting device, as mentioned above with respect to FIG. 5.

Figure 8A:
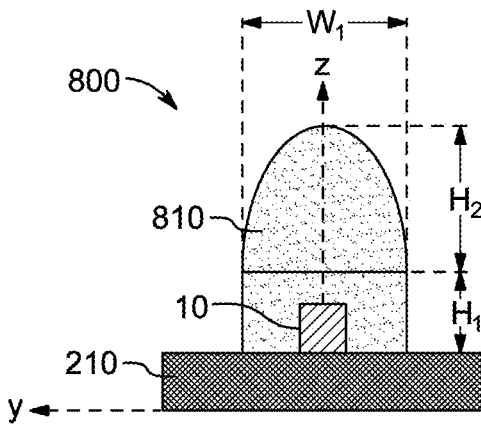
FIG. 8A is a diagram of yet another example unit cell in side (YZ) view.
Figure 8B:
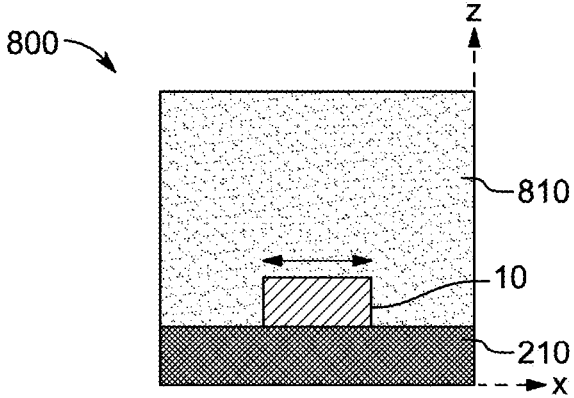
FIG. 8B is a diagram of the example unit cell of FIG. 8A in front (XZ) view.
Figure 8C:
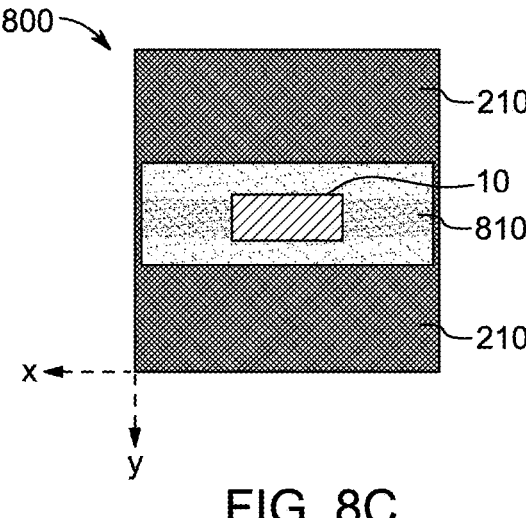
FIG. 8C is a diagram of the example unit cell of FIGS. 8A and 8B in top down (XY) view.

FIG. 8A is a diagram of yet another example unit cell 800 in side (YZ) view. FIG. 8B is a diagram of the example unit cell 800 of FIG. 8A in front (XZ) view. FIG. 8C is a diagram of the example unit cell 800 of FIGS. 8A and 8B in top down (XY) view. In the example illustrated in FIGS. 8A, 8B and 8C, in the side (YZ) view (a), the lens 810 has a smaller width w1 in the Y direction than the full pixel to pixel pitch. By making the width w1 of the lens 810 thinner along the axis of periodicity, pixels may be made to appear square on direct view. The resulting lens 810 has a more bullet-like shape (e.g., in comparison to the lenses illustrated in FIGS. 3 and 4) having a nominally vertical sidewall. By way of example, the dimensions of a lens that could result in a square-appearing pixel on direct view may be a height from the substrate 210 to the beginning of the lens curvature, H1, of 0.31 mm, a height of the curved portion of the lens, H2, of 0.18 mm, and a width W1 of 0.315 mm, for an underlying LED die having a length and width of 0.25 mm. All of these dimensions may be considered to include +/−10% tolerances.

Figure 9A:
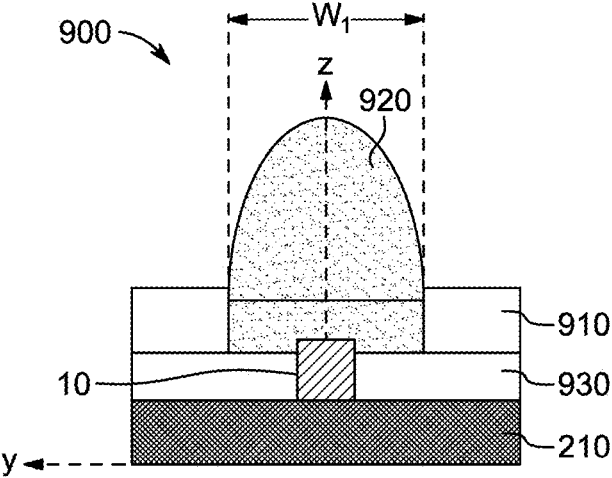
FIG. 9A is a diagram of yet another example unit cell in side (YZ) view.
Figure 9B:
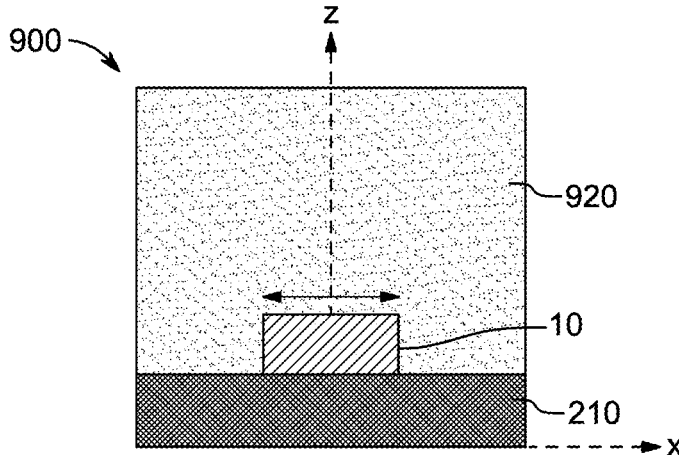
FIG. 9B is a diagram of the unit cell of FIG. 9A in front (XZ) view.
Figure 9C:
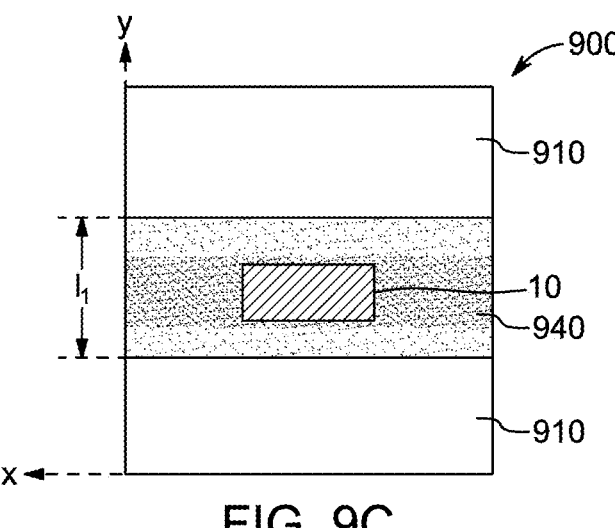
FIG. 9C is a diagram of the unit cell of FIGS. 9A and 9B in top down (XY) view.

FIG. 9A is a diagram of yet another example unit cell in side (YZ) view. FIG. 9B is a diagram of the unit cell of FIG. 9A in front (XZ) view. FIG. 9C is a diagram of the unit cell of FIGS. 9A and 9B in top down (XY) view. The unit cell 900 illustrated in FIGS. 9A, 9B and 9C employs a combination of the techniques described above with respect to FIGS. 5-8 to create a unit cell that appears as a square pixel on direct view. While all of the techniques have been illustrated in FIGS. 9A, 9B and 9C, one of ordinary skill in the art will understand, from FIG. 9, how two or more techniques described herein could be used to create a square-appearing pixel.

In the example illustrated in FIGS. 9A, 9B and 9C, the unit cell 900 includes an LED 10 on substrate 210. In side (YZ) view, the unit cell 900 includes a first reflective layer 930 on the substrate 210 with a second reflective layer 910 formed over the first reflective layer 930 and covering a lower portion of the outside surface of the lens 920. Additionally, the lens 920 has a smaller width, w1, along the axis of periodicity (Y axis) that is less than the pitch between adjacent LEDs. Front (XZ) view shows an option where the first reflective layer 930 is omitted and also shows that the LED die is wider in the X direction than it is long in the Y direction. In top (XY) view, an aperture 940 is visible where the lens 920 is exposed from the second reflective layer 910. As mentioned already, the magnitude of the width, w1, of the lens 920 along the axis of periodicity (Y), the length, l₁, of the window 940 (and corresponding height of the second reflective layer 910 in the Z direction), as well as the aspect ratio of the LED die, can be adjusted to produce an LED that has the required far-field intensity distribution, meets power consumption requirements, and has a square pixel shape on direct view.

Figure 10:
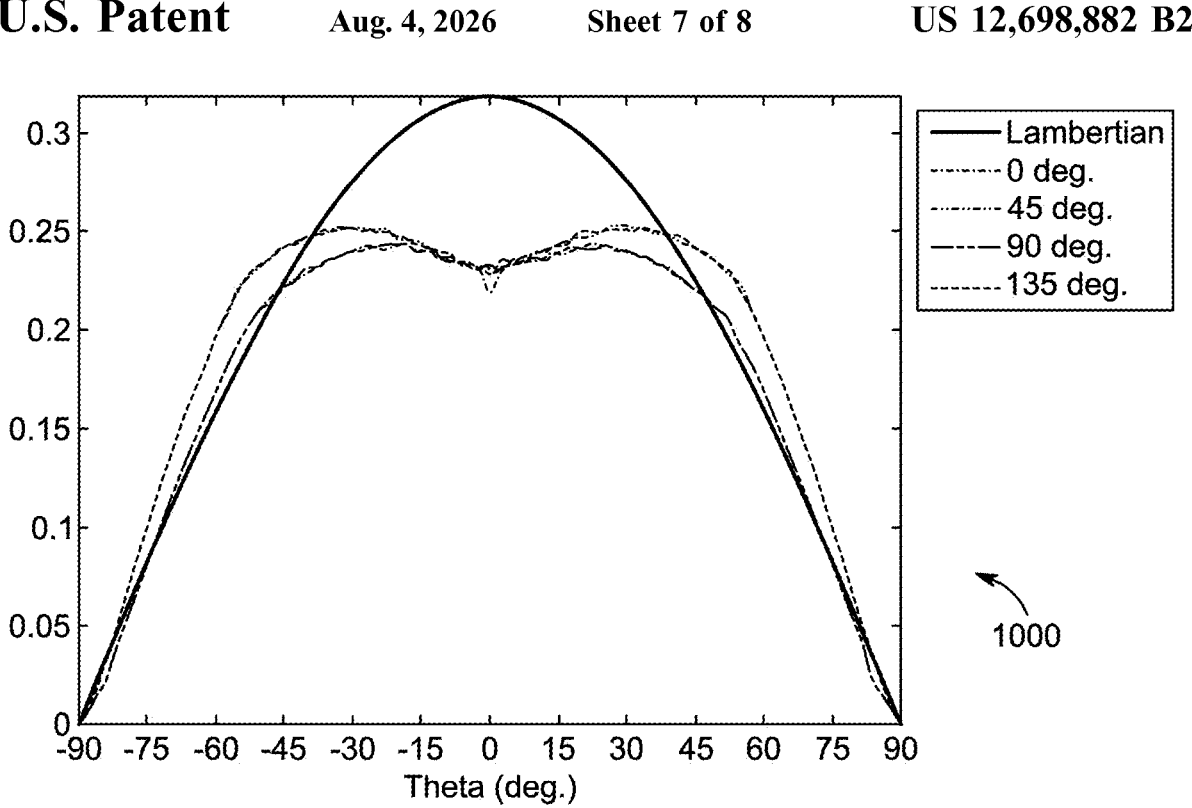
FIG. 10 is a graph showing the far-field intensity distribution of a bare LED on a substrate.
Figure 11:
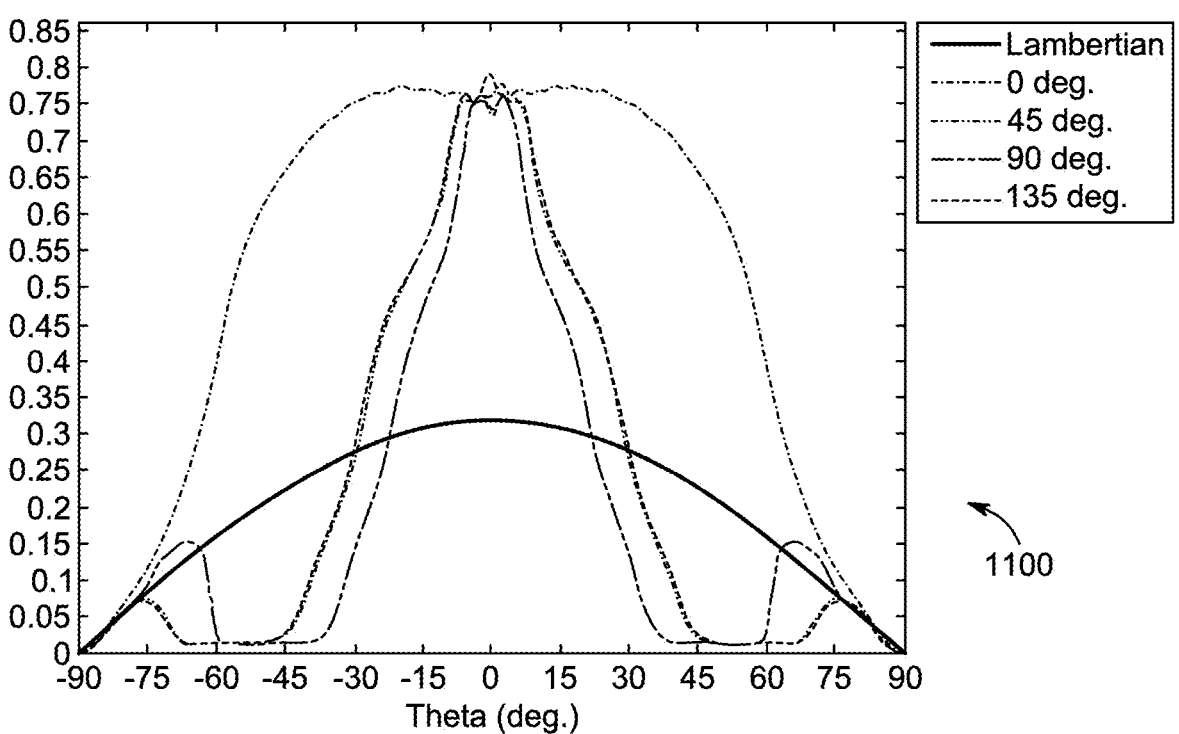
FIG. 11 is a graphs 1000 showing the far-field intensity distribution of an LED array with a lens array.

FIGS. 10 and 11 are graphs 1000 and 1100 showing the far-field intensity distribution of a bare LED on a substrate and the far-field intensity distribution of an LED array with a lens array, such as described in the embodiments above. In FIG. 11, assume that the cylindrical lens is oriented so that is refracts light vertically (along the y-axis) and the horizontal (x-axis) is invariant. As can be seen in FIG. 11, the light emitted at 0 degrees (along the x-axis) is more Lambertian while the light emitted at 90 degrees (along the y-axis) is emitted in a narrower angular range. Further, comparing FIGS. 10 and 11, the intensity of the light emission is higher where a cylindrical or bullet-shaped lens is used with peak illuminance being approximately 3× higher than the same LED array without such lens.

Figure 12:
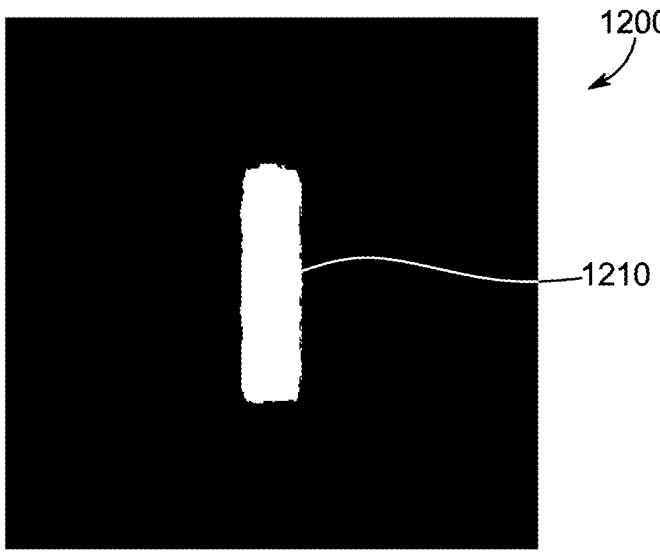
FIG. 12 is an example of the direct view of a pixel with a cylindrical lens array without additional compensations made to it and the direct view of a pixel with a lens array and at least one of the modifications described herein made to it.
Figure 13:
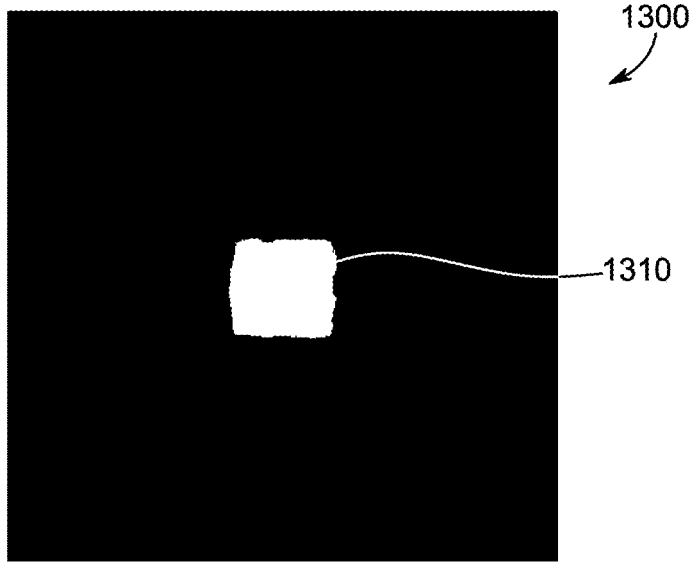
FIG. 13 is the direct view of a pixel with a lens array and at least one modification.

FIGS. 12 and 13 are examples 1200 and 1300 of the direct view of a pixel with a cylindrical lens array without additional compensations and the direct view of a pixel with a lens array and at least one of the modifications described herein with respect to FIGS. 3, 4, 5, 6, 7, 8 and/or 9. As can be seen in FIG. 12, without any modification to the lenses or underlying LED dies, the pixel 1210 appears rectangular on direct view. However, when one or more modifications are made to either the lenses, the underlying LED dies, or both, the pixel 1310, as illustrated in FIG. 13, appears square on direct view.

In some embodiments, an aspect ratio may be selected for the LED dies such their light emission (or pixel shape) appears square on direct view. For example, an aspect ratio may be chosen between 1:1 and 8:1 with each of the LEDs being longer along the axis of periodicity than along the invariant axis such that light emission from each of the LED dies appears square on direct view. Additionally or alternatively, in some embodiments, a layer of reflective material may be formed over the common substrate and covering a portion of an outer surface of each of the lenses, creating apertures through which portions of the lenses are exposed. In some embodiments, a first layer of reflective material may also be formed over the common substrate, surrounding each of the LED dies, and a second layer of reflective material may be formed over the first layer of reflective material and covering a portion of an outer surface of each of the lenses. Viewing the pixels on direct view through the apertures, the pixels will appear square. Additionally or alternatively, in some embodiments, a width of each of the lenses along the axis of periodicity may be chosen to have a magnitude smaller than the pitch between adjacent LED dies, which will also make the light emission (or pixel shape) appear square on direct view.

In some embodiments, one of more of the above-described mechanisms may be applied in forming the lighting device. For example, the aspect ratio of the LED dies may be chosen such that the LED dies are longer in one dimension than another, the lenses may be at least partially covered with a reflective material to create apertures, and/or the lenses may be formed to have a width less than the pitch between adjacent LEDs. In such cases, the exact aspect ratio, the width of the lenses along the axis of periodicity, and the height of the reflective material partially covering the outer surface of the lenses may be chosen, along with other dimensions and curvature of the lenses, may be chosen for the particular application with the goal of producing a lighting device that (a) is optimized to direct light emitted from the LED into a narrow far-field angular range along the axis of periodicity with full width half maximum (FWHM) ~+/−15 degrees or less while maintaining Lambertian (+/− 60 deg.) profile along the invariant axis and (b) includes pixels that appear square on direct view.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed:

1. A lighting device comprising:
an LED array comprising rows and columns of light-emitting diode (LED) dies on a common substrate; and
a lens array over the array of LED dies,

wherein the lens array comprises a plurality of lenses each having a bullet-shaped cross-section and disposed over a respective row of the LED dies in the LED array such that an invariant axis of each lens is aligned along a respective row of LEDs and an axis of periodicity of the lenses is perpendicular to the invariant axis, and
wherein each of the LED dies in the LED array is longer along the axis of periodicity than along the invariant axis.

2. The lighting device of claim 1, wherein each of the plurality of lenses comprises a single molded lens.

3. The lighting device of claim 1, wherein each of the plurality of lenses comprises a single molded hemispherical lens over at least one planar silicone layer.

4. The lighting device of claim 1, wherein an aspect ratio of each of the LED dies between 1:1.1 and 8:1.

5. The lighting device of claim 1, further comprising a first layer of a reflective material over the common substrate and surrounding each of the LED dies.

6. The lighting device of claim 5, further comprising a second layer of a reflective material over the first layer of reflective material and covering a portion of an outer surface of each of the plurality of lenses, creating apertures through which portions of the lenses are exposed.

7. The lighting device of claim 6, wherein a height of the second layer of reflective material above the first layer of reflective material is between 0.1 μm and a full height of the lens.

8. The lighting device of claim 6, wherein the first reflective material and the second reflective material are either a dispensed reflective side coat (DSC) or an optical side coat (OSC) applied by other means.

9. The lighting device of claim 1, wherein each of the plurality of lenses is narrower along the axis of periodicity than a pitch between adjacent LED dies.

10. The lighting device of claim 9, wherein a side wall of each of the plurality of lenses is nominally vertical.

11. The lighting device of claim 1, wherein at least two of:
each of the LED dies in the LED array is longer along the axis of periodicity than along the invariant axis;
the lighting device comprises a layer of reflective material over the substrate covering a portion of an outer surface of each of the plurality of lenses, creating apertures through which portions of the lenses are exposed; or
each of the plurality of lenses is thinner along the axis of periodicity than the pitch between adjacent LED dies.

12. The lighting device of claim 1, wherein the lighting device is one of a display-based tail light, a standard tail light, a signaling light, a daytime running light, decorative trim, a pool light, a headlight, or other matrix display.

13. A method of manufacturing a lighting device, the method comprising:
forming an LED array by arranging rows and columns of light-emitting diode (LED) dies on a common substrate;
selecting an aspect ratio for the LED dies between 1.1:1 and 8:1 with each of the LED dies being longer along the axis of periodicity than along the invariant axis such that light emission from each of the LED dies appears square on direct view;
forming a lens array to have a plurality of lenses, each having a bullet-shaped cross-section;
aligning the lens array over the LED array such that each of the lenses is aligned along a respective row of the LEDs and an axis of periodicity of the lenses is perpendicular to the invariant axis.

14. The method of claim 13, further comprising forming a layer of a reflective material over the common substrate and covering a portion of an outer surface of each of the plurality of lenses, creating apertures through which portions of the lenses are exposed.

* * * * *